US007992026B2

(12) United States Patent
Eade et al.

(10) Patent No.: US 7,992,026 B2
(45) Date of Patent: Aug. 2, 2011

(54) CONTROLLING BROADCAST CONTENT PROCESSING USING DISPLAY STATE INFORMATION

(75) Inventors: Mika Pauli Eade, Oulu (FI); Arno Olavi Tuominen, Kempele (FI)

(73) Assignee: Nokia Corporation, Espoo (FI)

( * ) Notice: Subject to any disclaimer, the term of this patent is extended or adjusted under 35 U.S.C. 154(b) by 503 days.

(21) Appl. No.: 11/975,442

(22) Filed: Oct. 19, 2007

(65) Prior Publication Data

US 2009/0106800 A1    Apr. 23, 2009

(51) Int. Cl.
*G06F 1/00*      (2006.01)
*G06F 1/26*      (2006.01)
*G06F 11/30*     (2006.01)
*G06F 3/00*      (2006.01)
*H04Q 1/30*      (2006.01)
*H01Q 11/12*     (2006.01)
*G09F 27/00*     (2006.01)

(52) U.S. Cl. .......... 713/324; 713/320; 713/340; 725/40; 340/7.32; 455/127.5; 381/124

(58) Field of Classification Search .......... 725/40, 725/135; 713/324, 320, 340; 340/5.61, 7.32; 455/127.1–127.5; 381/124
See application file for complete search history.

(56) References Cited

U.S. PATENT DOCUMENTS

| | | | |
|---|---|---|---|
| 5,805,159 A | 9/1998 | Bertram | |
| 5,991,637 A | 11/1999 | Mack, II et al. | |
| 6,266,589 B1 | 7/2001 | Boies et al. | |
| 7,124,938 B1 | 10/2006 | Marsh | |
| 7,643,095 B2 * | 1/2010 | Yoshii | 348/687 |
| 2003/0186661 A1 | 10/2003 | Fricke et al. | |
| 2005/0264702 A1 * | 12/2005 | Yoshii | 348/687 |
| 2006/0268965 A1 | 11/2006 | Ibrahim et al. | |
| 2006/0281499 A1 * | 12/2006 | Farrow | 455/574 |
| 2007/0067097 A1 * | 3/2007 | Haatainen | 701/208 |
| 2007/0096935 A1 * | 5/2007 | Lee et al. | 340/815.42 |
| 2007/0243850 A1 * | 10/2007 | Arai | 455/343.1 |
| 2009/0104941 A1 * | 4/2009 | Kwon et al. | 455/566 |

FOREIGN PATENT DOCUMENTS

| | | |
|---|---|---|
| EP | 1791331 | 5/2007 |
| GB | 2357667 | 6/2001 |
| GB | 2427325 | 12/2006 |
| JP | 08307296 | 11/1996 |
| JP | 09-326716 | * 12/1997 |
| JP | 2000-032580 | * 1/2000 |
| JP | 2001-230859 | 8/2001 |
| WO | WO 03/007135 | 1/2003 |
| WO | WO2005/039079 | 4/2005 |

* cited by examiner

*Primary Examiner* — Hoang-Vu A Nguyen-Ba

(74) *Attorney, Agent, or Firm* — Hollingsworth & Funk, LLC

(57) ABSTRACT

Controlling supplementary data channels using display state information involves processing, at a user device, a first broadcast signal having a content channel and a second signal having a supplementary data channel. The supplementary data channel is related to the content channel. The broadcast channel and supplementary channel are rendered to a user via the user device. The supplementary channel is at least partially rendered on a display of the user device. An event is determined that causes the display to be no longer viewable by the user. In response to determining the event, processing and rendering the supplementary data channel is ceased. The action of ceasing to process the supplementary data channel results in lowering power consumption of the user device.

20 Claims, 6 Drawing Sheets

CONTROLLING BROADCAST CONTENT PROCESSING USING DISPLAY STATE INFORMATION

FIELD OF THE INVENTION

This invention relates to power conservation in computing devices.

BACKGROUND OF THE INVENTION

The use of mobile communications devices has increased rapidly over the past decades. These devices are including ever more powerful processors and increasing amounts of memory, while at the same time getting smaller and more power efficient. Even so, managing power consumption is a significant challenge on mobile devices. As new hardware and software features are added, designers must carefully consider power consumption ramifications.

As mobile devices have advanced, so have the networks with which they connect. Modern digital cellular networks for carrying voice data are well-established, and these networks are increasingly being expanded to handle packet switched data for allowing access to the Internet and other networks. Mobile devices are also often capable of accessing non-cellular networks such as 802.11 wireless, or "WiFi™." These capabilities enable mobile devices to Mobile devices may also be capable of receiving data from other types of networks, such as broadcast networks. These broadcast networks may include analog and digital TV and radio, as well as sub-bands of these networks used for sending data traffic. For example, the Radio Data System (RDS) is a European Broadcasting Union standard for sending (typically small amounts of) digital information using analog Frequency Modulation (FM) radio broadcasts. Stations can use RDS for broadcasting such data as clock time, station identifiers, program type, information describing currently playing content, etc. Similar systems for sending digital data associated with radio broadcasts include Amplitude Modulation Signaling System (AMSS), DirectBand™, Program Associated Data (PAD), Subsidiary Communications Authority (SCA), Subsidiary Communications Multiplex Operations (SCMO), etc. Other broadcast technologies, such as Digital Audio Broadcasting (DAB), Digital Radio Mondiale (DRM), HD Radio, etc., were designed from the outset to include the ability for broadcasters to insert digital data associated with content broadcasts.

Although consumers will continue to want two-way, packet-switched networking capabilities in mobile devices, these broadcasting technologies can also be advantageously exploited in mobile devices. One advantage of these technologies is that they are often free, offer high-bandwidth and quality signals, and do not require the mobile device to transmit. Therefore, even if a user could stream Internet radio from a device, they might prefer to listen to a broadcast station if it has higher quality sound and allows them to listen for a longer amount of time (e.g., more power efficient). Nonetheless, even broadcast receiving circuitry draws some amount of power, and finding ways of more efficiently receiving broadcast data on a mobile device is desirable.

SUMMARY OF THE INVENTION

To overcome limitations in the prior art described above, and to overcome other limitations that will become apparent upon reading and understanding the present specification, the present invention discloses a system, apparatus and method for conserving power in computing devices. In accordance with one embodiment of the invention, an apparatus includes a display, a receiver, and memory. A processor is coupled to the memory, the receiver, and the display. The memory stores instructions that causes the processor to process content from a broadcast signal received via the receiver, render the content on the display, determine an event that causes the display to non-viewable by the user, and cease to process the broadcast content in response to the event while continuing to process other broadcast content via the receiver.

In a more particular embodiment, the event includes a deactivation of a backlight of the display. In another configuration, the other broadcast content includes an audio signal derived from broadcast radio, and the content includes supplemental digital data that is broadcast in conjunction with the broadcast radio. In yet another configuration, the apparatus further includes an application specific integrated circuit coupled to the processor for processing the content from the broadcast signal. In such a case, ceasing to process broadcast content involves removing power from the application specific integrated circuit. In another more particular embodiment, the apparatus further includes interface circuitry coupling the receiver to the processor. In this case, ceasing to process broadcast content involves removing power from the interface circuitry.

In another embodiment of the invention, a method involves processing, at a user device, a first broadcast signal having a content channel and a second signal having a supplementary data channel that is related to the content channel. The broadcast channel and supplementary channel are rendered to a user via the user device. The supplementary channel is at least partially rendered on a display of the user device. An event is determined that causes the display to be no longer viewable by the user. The device ceases to process and render the supplementary data channel in response to determining the event. Ceasing to process the supplementary data channel results in lowering power consumption of the user device.

In a more particular embodiment, the event includes a power saving event. The power saving event may include a deactivation of a display of the user device, such as a deactivation of a backlight of the display. In another variation, the first broadcast signal and second signal are processed by a common receiver of the user device. In such a case, the broadcast signal may include a frequency modulated radio signal. More particularly, the supplementary data channel may include a radio data system channel, and rendering the supplementary data channel involves displaying text encoded via the radio data system channel.

In other, more particular embodiments, ceasing to process and render the supplementary data channel involves removing power from circuitry used to at least process the supplementary data channel. In another variation, the method further involves continuing to render the broadcast channel to the user while ceasing to process and render the supplementary data channel.

In another embodiment of the invention, an apparatus includes a display, a receiver, and memory. A processor is coupled to the memory, the receiver, and the display. The memory stores instructions that causes the processor to: process, via the receiver, a broadcast signal having a content channel and supplementary data channel; render the broadcast channel and supplementary channel to a user of the apparatus, wherein the supplementary channel is at least partially rendered on the display; determine an event that causes the display to be no longer viewable by the user; and cease to process and render the supplementary data channel in response to determining the event, wherein ceasing to process the supplementary data channel results in lowering power consumption of the apparatus.

In a more particular embodiment, the event that causes the display to be no longer viewable by the user includes an automatic deactivation of the display, and the automatic deactivation of the display may include a deactivation of a backlight of the display. In another arrangement, the broadcast signal includes a frequency modulated radio signal. In such a case, the supplementary data channel comprises a Radio Data System channel, and wherein rendering the supplementary data channel comprises displaying text encoded via the Radio Data System channel.

In other, more particular embodiments, the apparatus further includes a headset coupled to the processor via an input/output bus interface, and in this arrangement the receiver is included in the headset. In such a case, ceasing to process and render the supplementary data channel involves removing power from the input/output bus interface.

In another embodiment of the invention, a computer-readable storage medium includes instructions executable by a processor of a user device for: processing a first broadcast signal having a content channel and a second signal having a supplementary data channel that is related to the content channel; rendering, to a user, the broadcast channel and supplementary channel via the user device, wherein the supplementary channel is at least partially rendered on a display of the user device; determining an event that causes the display to be no longer viewable by the user; and ceasing to process and render the supplementary data channel in response to determining the event, wherein ceasing to process the supplementary data channel results in lowering power consumption of the user device.

In another embodiment of the invention, an apparatus includes: means for processing a first broadcast signal having a content channel; means for processing a second signal having a supplementary data channel that is related to the content channel; means for rendering, to a user, the broadcast channel and supplementary channel via the user device, wherein the supplementary channel is at least partially rendered on a display of a user device; means for determining an event that causes the display to be no longer viewable by the user; and means for ceasing to process and render the supplementary data channel in response to determining the event, wherein ceasing to process the supplementary data channel results in lowering power consumption of the user device.

These and various other advantages and features of novelty are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWING

The invention is described in connection with the embodiments illustrated in the following diagrams.

DETAILED DESCRIPTION OF EMBODIMENTS OF THE INVENTION

Figure 1:
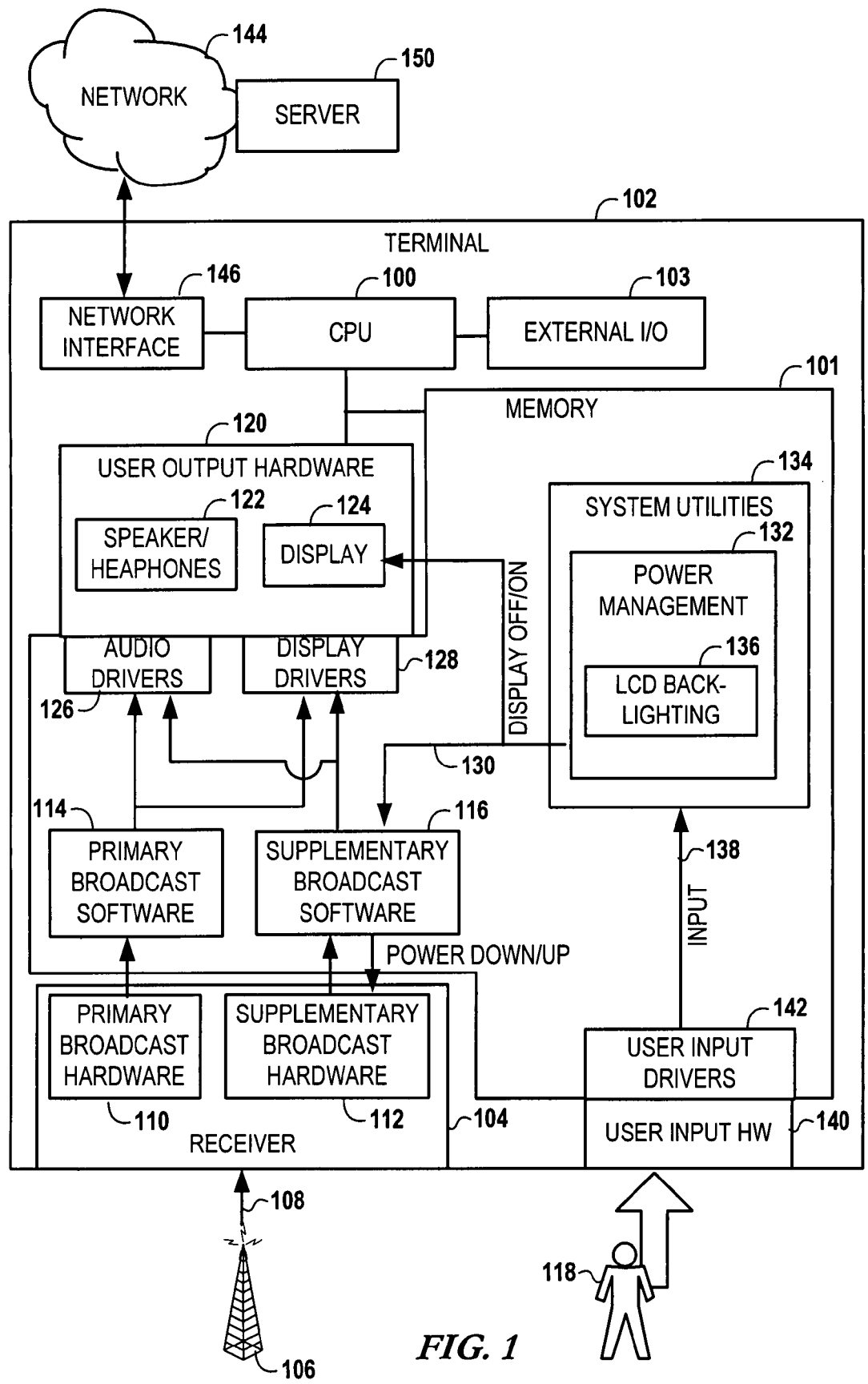
FIG. 1 is a block diagram illustrating a terminal arrangement according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present disclosure is directed to detecting events that allow a computing device to turn off supplementary data processing functions and thereby conserve power. In particular, where the supplementary data includes text or other information that is shown on a display, processing of the data is stopped when the user no longer can view the display. This inability to view the display may occur when the device goes into a power saving mode that shuts off a backlight of the display. In such a case, there may be no need to continue receiving, processing, and rendering the secondary data, and therefore any circuitry and/or software involved in that processing may be stopped in order to conserve power.

The present invention is generally applicable to computing devices, and in particular mobile computing devices, such as cell phones, personal digital assistants (PDAs), media players, etc. However, even though various embodiments may be described in terms of mobile computing devices, those skilled in the art will appreciate that such concepts may be extended to other portable and non-portable consumer electronics. For example, there is increasing demand for desktop computers that consume significantly less power, and concepts described herein may be able facilitate savings on these devices as well.

In one embodiment of the invention, a device includes a broadcast receiver that includes primary content channels and supplementary data channels. An example of this is a mobile device with circuitry that processes RDS data associated with an FM broadcast. The RDS data is often used to send program station name information and other data, such as commercials and information which may be of interest to the FM radio listeners. The mobile device may include specialized circuitry for processing the RDS data and render it on a device display. The specialized RDS processing circuitry (and/or I/O bussing needed to access that circuitry) may consume an appreciable amount of power, and thereby reduces the mobile terminal's stored battery power available for other functions. Although processing this type of supplementary data is a useful feature, it may not be needed all of the time. For example, the user may often listen to the radio using headphones, and slip the mobile device in their pocket where the user cannot see the supplementary data. In such a situation, there is no reason to expend power processing the supplementary data if the user can not perceive it.

Therefore, if a user device can detect when the user can no longer see the display, then it can cease processing this type of supplementary data to conserve power. Although it may be possible for a device to detect, for example, that it is in a user's pocket, there may be other events that provide equivalent indications. For example, portable devices often will poll for user inputs events, and switch off output devices after a certain amount of time when no input is detected. Therefore, a device according to an embodiment of the invention may be able to turn off supplementary broadcast data processing in response to a display or similar output device being powered off or otherwise entering a state where the user can no longer perceive outputs from the device.

In reference now to FIG. 1, a block diagram illustrates one implementation of a power management in a terminal 102. The terminal 102 may be a general purpose computing device, as indicated by central processing unit 100 coupled to memory 101, and external input/output bus 103. The terminal 102 also includes a receiver 104 usable for receiving content 108 from a broadcaster 106. The content 108 may be sent from broadcaster 106 to receiver 104 using any combination of wired and wireless transmission known in the art. The broadcast content 108 may include primary content (e.g., audio, video, multimedia streams) and supplementary content. Generally, supplementary content is any content that is distinctly separable from, yet associated with, the primary content. Supplementary content is typically sent to the terminal 102 in conjunction with the primary content (e.g., at or about the same time). In a system such as RDS, the supplementary content may include text associated with the current content. The association between primary and supplementary content may exist because of what the content contains (e.g., descriptive text regarding the currently playing content) and/or how the content is sent (e.g., sent on data channel associated with the primary content broadcast channel).

The receiver 104 may include primary and supplementary hardware 110, 112 processing modules to respective separately process the primary and secondary portions of the content 108. Some or all of the hardware 110, 112 may be implemented, for example, as application-specific integrated circuits (ASICs). The terminal 102 may include software modules 114, 116 that respectively interface the hardware modules 110, 112. Those of skill in the art will appreciate that the delineation between the hardware modules 110, 112 and software modules 114, 116 may vary depending on the particular implementation. In some situations, software modules 114, 116 may not be required or involved in extracting data from the broadcasted content 108. However, in this context it may be assumed that the hardware modules 110, 112 process received electromagnetic signals in some form, and the software modules 114, 116 at least define some sort of interface (e.g., software or firmware drivers) that allow an operating system (OS) (not shown) of the terminal 102 to control at least one of the modules 110, 112 and access content decoded by at least one of the modules 110, 112.

The receiver 104 and its associated software components 114, 116 can be used to render the content 108 to a user 118 by way of user output hardware 120. Typical output hardware includes speakers/headphones 122 and a display 124, although the hardware 120 may include any apparatus that converts data to a form perceivable by a user 118. The hardware 120 typically operates with operating system drivers, such as audio drivers 126 and video drivers 128. The drivers 126, 128 allow specialized or general purpose software to render signals via the hardware 120. In the illustrated example, the software modules 114, 116 that process the broadcast 108 can send content data to one or both of the audio and display drivers 126, 128.

In one example, if the broadcast 108 includes RDS encoded FM radio, the primary broadcast module 114 may provide analog or digital stereo audio which are sent to the audio drivers 126 for playback via speakers/headphones 122. The primary broadcast module 114 data may also be sent to the display drivers 128, either directly or indirectly, such as by way of an application program running on the terminal 102. For example, the primary broadcast module 144 may provide information such as FM frequency and signal strength that is read from the hardware 144 by an application, which shows this data in the display 124. It will be appreciated that in some configurations, the coupling between the receiver 104 and speakers/headphones 122 may be implemented without any intermediary software 114, 126, or may include software that only controls power on/off and switching between audio sources.

The supplementary broadcast module 116 may similarly send data to one or both of audio 126 and display drivers 128, either directly or indirectly (e.g., via a media player application). Continuing the example of the primary channel being a stereo FM broadcast 108, the supplemental data may include RDS text that is shown in the display 124 contemporaneously with the rendering of the audio via speakers/headphones 122. This text may contain, for example, data related to the currently playing selection such as song title, album, artist, station ID, etc.

While in operation, a system component such as the supplementary broadcast software 116 may monitor display state changes 130, by way of a power management module 132 that may be included as part of system utilities 134. The system utilities 134 may be an OS API or service, although in other configurations, the state changes 130 may be measured directly from hardware, such as by a voltage read directly from the display 124. In this example, the power state change 130 indicates the switching on or off of a backlight by way of an LCD backlight controller 136. The power management module 132 may cause the backlight controller 136 to turn off the display backlight based on lack of user inputs 138 received by way of input hardware 140 and associated drivers 142. In response to detecting the display 124 switching off, the supplementary broadcast software 126 may in turn power down the supplementary broadcast circuitry 112 to conserve power.

It will be appreciated that the detection of backlight state 130 is merely an example of terminal state that may be checked to determine that the display 124 cannot be viewed, and thereby de-power the circuitry 112. In alternate configurations, power may be removed completely from the display 124, and/or the backlight may be dimmed to indicate to the user 118 that display shutdown will soon follow. These power off or dimming events can be used with or instead of backlight on/off states. Other examples of events that may signal that the display 124 is no longer readable include closing of a clamshell, cover or other obstruction that may block the view of the display 124. These obstruction events also typically cause the display 124 to power down (e.g., by detecting closing or opening of a switch), although it may still useful or convenient to read these triggering events in addition to or instead of display state (e.g., from a switch) to more finely tailor other system parameters. Other events that might be used to de-power the circuitry 112 include receipt of a phone call, muting of the speaker/headphones 122, a parallel running application taking up the full display 124, etc.

The terminal 102 in FIG. 1 is a representative mobile computing arrangement capable of carrying out operations according to embodiments of the invention, and landline computing systems similarly include computing circuitry to perform such operations. A is known in the art, the CPU 100 controls the basic functions of the device 102. Those functions associated may be included as instructions stored in the program storage/memory 101. In one embodiment of the invention, the program modules associated with the storage/memory 101 are stored in non-volatile electrically-erasable, programmable read-only memory (EEPROM), flash read-only memory (ROM), hard-drive, etc. so that the information is not lost upon power down of the mobile terminal 102. The relevant software for carrying out conventional mobile terminal operations and operations in accordance with the present invention may also be transmitted to the mobile computing arrangement 102 via data signals, such as being downloaded electronically via a network interface 146 coupled to one or more networks 144, such as the Internet and an intermediate wireless network(s).

The mobile computing arrangement 102 may include multiple network interfaces 146 for maintaining any combination of wired or wireless data connections. For example, a wireless interface 146 may include a digital signal processor (DSP) employed to perform a variety of functions, including analog-to-digital (A/D) conversion, digital-to-analog (D/A) conversion, speech coding/decoding, encryption/decryption, error detection and correction, bit stream translation, filtering, etc. A wireless network interface 146 may include a transceiver, generally coupled to an antenna, transmits the outgoing radio signals and receives the incoming radio signals associated with a wireless device 102.

The incoming and outgoing radio signals may be used to communicate with a mobile service provider network 144. The network 144 may include any voice and data communications infrastructure known in the art, including CDMA, W-CDMA, GSM, EDGE, EVDO, WiMax™, WiFi™, etc. The network 144 typically provides access to traditional landline data infrastructures, including IP networks such as the Internet. The mobile computing arrangement 102 may also include an alternate network/data interface (not shown) capable of accessing the network 144 and/or a proximity network (not shown). The alternate data interface may incorporate combinations of I/O and network standards such as USB, Bluetooth™, Ethernet, 802.11 Wi-Fi™, IRDA™, WiMax™, etc. The alternate data interface may be receive-only, and capable of receiving broadcast/unicast digital or analog encoded video, audio, text, and other user perceivable data via wired or wireless media.

The processor 100 is also coupled to user-interface elements 120, 140 associated with the mobile terminal 102. The user-interface of the mobile terminal may include, for example, a display 124 such as a liquid crystal display. Other user-interface mechanisms may be included in the interface, such as keypads, speakers 122, microphones, voice commands, switches, touch pad/screen, graphical user interface using a pointing device, trackball, joystick, etc. One or more sensors (not shown) may also be coupled to the processor 100. The sensors may include sensor(s) capable of determining terminal context, including any combination of time, location, acceleration, proximity, environmental conditions, electromagnetic/optical transmissions, etc. These and other external interface components are coupled to the processor 100 as is known in the art.

The program storage/memory 101 typically includes operating systems and programs for carrying out functions and applications associated with functions on the mobile computing arrangement 102. The program storage 101 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 101 of the mobile computing arrangement 102 may also include software modules for performing functions according to embodiments of the present invention, as more fully described elsewhere herein.

It will be appreciated that the terminal 102 arrangement is one example of a device that may utilize concepts described herein, and may be formed from combinations of physically discrete devices that are wired or wirelessly coupled together. Further, the invention may be applicable to other supplementary channels that are received from a source that is independent of the broadcast signal 108. For example, the supplementary broadcast software 116 may be able to obtain the supplementary data via the network interface 146, such as via an Internet server 150 that is run by or independent of the broadcaster 106. In another example, the supplementary data could be sent via the network 144 using data "push," such as Wireless Application Protocol (WAP) Push. In these alternate arrangements, the network interface 146 may be powered down (or otherwise put in a power saving state) in response to a state change 130 of the display 124 or the like.

Figure 2:
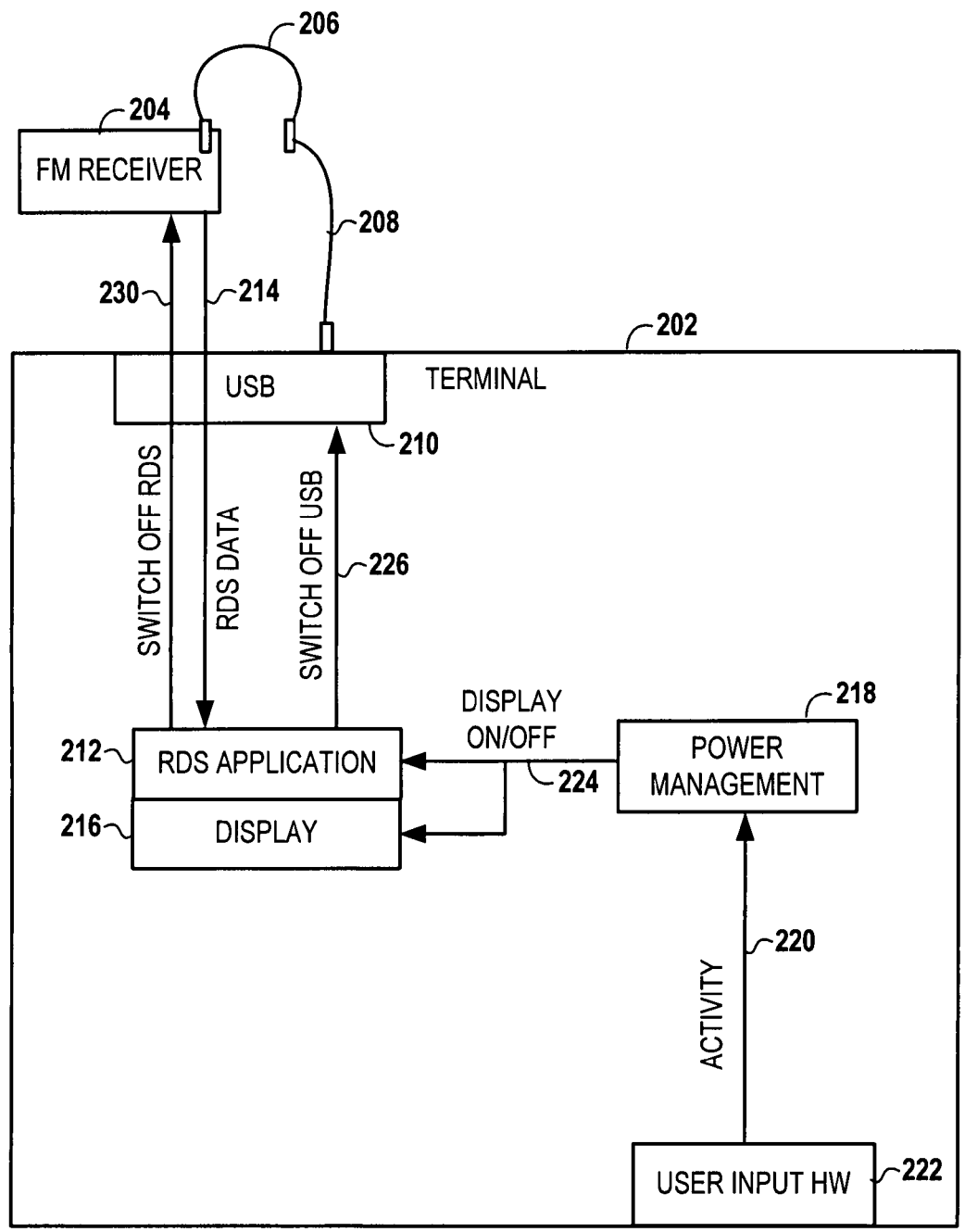
FIG. 2 is a block diagram showing an alternate terminal arrangement according to an embodiment of the invention.

In another example of a hardware configuration according to an embodiment of the invention, FIG. 2 shows an alternate terminal arrangement 202 having an FM receiver section 204 located in external headphone set 206. The terminal arrangement 202 may include functionality as shown in terminal 102 of FIG. 1, including processor, memory, network capability, etc., that are not shown in FIG. 2. The illustrated headphone 206 interfaces with the terminal 202 by way of a USB cable 208 of the headphones 206 and USB port 210 of the terminal 202.

The FM receiver 204 may be placed in the headphones 206 to improve reception. For example, the headphones 206 may be part of a digital headset that provide voice call interface with the device 202. In typically installations, an FM receiver would be included in the body of the device 202, and the headphone cable 208 would be used as an antenna. In this example where the headphone cable 204 carries USB data, the USB signals may interfere with FM reception, and therefore the cable 204 may not make a good FM antenna. Therefore, the receiver 204 is packaged with an antenna in the headphones 206, and audio decoding, amplification, etc. may be performed inside the headphones 206. Any supplementary data (e.g., RDS data) extracted by the receiver 204 is fed into the terminal 202 via the USB port 210. An RDS application 212 receives the RDS data 214 via the USB port 210, and renders the data 214 on a display 216.

The terminal 202 includes a power management module 218 that monitors user input activity 220 via user input hardware 222. In response to there being no user activity 220 for a predetermined amount of time, the power management module 218 signals 224 to the display 216 to switch off (e.g., turn off backlight). The RDS application 212 can also directly or indirectly receive/detect/determine this signal 224, and initiate at least a powering off of the USB port 210 as indicated by signal 226. The receiver 204 may also be capable of de-powering RDS circuitry in the receiver 204 to save power. In such a case, before switching off 228 the USB port 210, the RDS application 212 can send a signal 230 to switch off this RDS circuitry. It will be appreciated that the concepts illustrated in FIG. 2 may be applied to other peripheral communications besides USB, including Bluetooth™, WiFi™ Ethernet, IRDA™, IEEE 1384, RS 232, etc.

Figure 3:
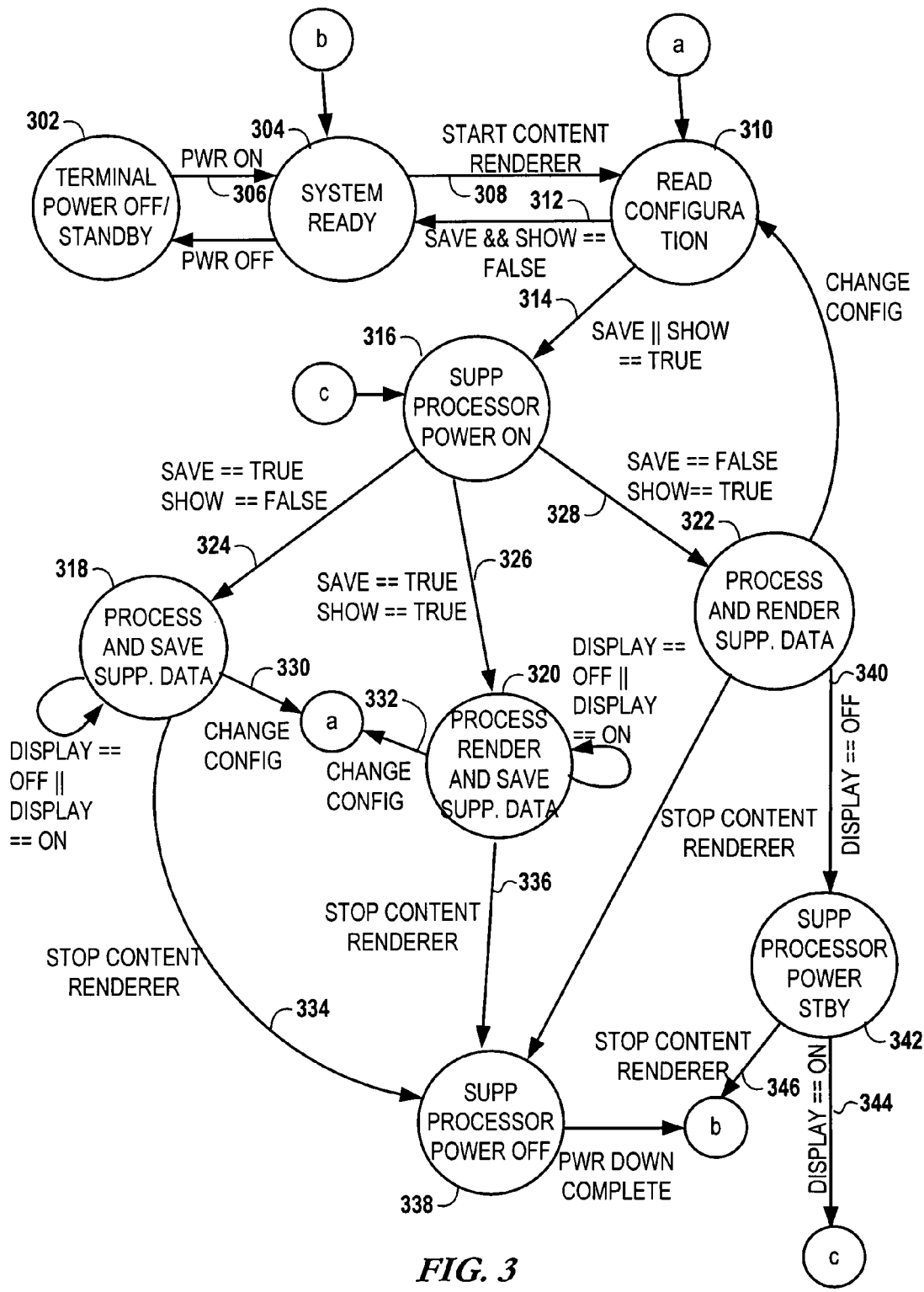
FIG. 3 is state diagram showing power conservation states of a mobile computing arrangement according to an embodiment of the invention.

In reference now to FIG. 3, a state diagram illustrates various features and operations of power management logic according to an embodiment of the invention. The starting state 302 corresponds to device power off or standby, and the device transitions to a system ready state 304 upon receipt of a power on command 306. From system ready 304, content rendering application/service is started 308, either by user action or automatic startup program or script. The content renderer at least renders supplementary data received at the device.

In response to startup 308, the application reads 310 a configuration, such as may be stored in a file or database. The configuration may also be read 310 by way of a user interface input. In this example, it may be assumed that the application that processes the supplementary data may do more with the data than show it on the display. In particular, the system may record the data to persistent storage (e.g., hard drive, flash memory) in order to keep a playlist that the user may later refer to in order to find out about, for example, a particular song they just heard. In this scenario, these two options are indicated as "save" and "show." In the trivial case where neither is enabled 312, the application quits and returns to system ready 304.

Assuming that the application is configured to do at least one of showing or saving the supplementary data 314, the supplemental processing circuitry is started 316. This circuitry may include any combination of decoders, amplifiers, encoders, and/or any intermediary I/O circuits/interfaces used to transfer the data (e.g., USB interface). After circuitry initialization 316 is complete three different data processing states 318, 320, 322 may be entered depending on the configuration settings, 324, 326, 328. States 318 and 320 involve saving data, and therefore the application will continue processing data unless there is a configuration change 330, 332 or content rendering is stopped 334, 336. In the response to configuration change 330, 332, the configuration is re-read 310. In response to content rendering being stopped 334, 336, the supplementary processor circuitry is powered down 338 and the system returns to ready state 304.

Assuming that there is no desire to record the data (e.g., state change 328) then state 322 can be interrupted if a display de-power event 340 is detected (or equivalent), in which case the supplemental circuitry goes to standby 342. The supplementary processing stays in this standby state 342 until the display goes back on 344, or if the content rendering is stopped 346. If the display goes back on 344, then the application powers on 316 the circuitry and resumes processing 322. If the content rendering is stopped 346, then, assuming there is no difference in states 342 and 338 besides entry and exit conditions, the system transitions to ready state 304.

This state diagram is only an example of how supplementary data processing and power management may be implemented according to an embodiment of the invention, and many variations are possible in light of these teachings. For example, the processing states 318, 320 where data is saved may be able to effectively operate when the display is off 340 by powering down for short amounts of time, powering up in order to poll the supplementary data for changes (e.g., check once every 10 seconds to see if a new song is playing) and the power down again. This occasional polling of the data might exhibit unacceptable lag for purposes of display, but may be acceptable for purposes of saving data for relatively long duration events such as songs.

Figure 4:
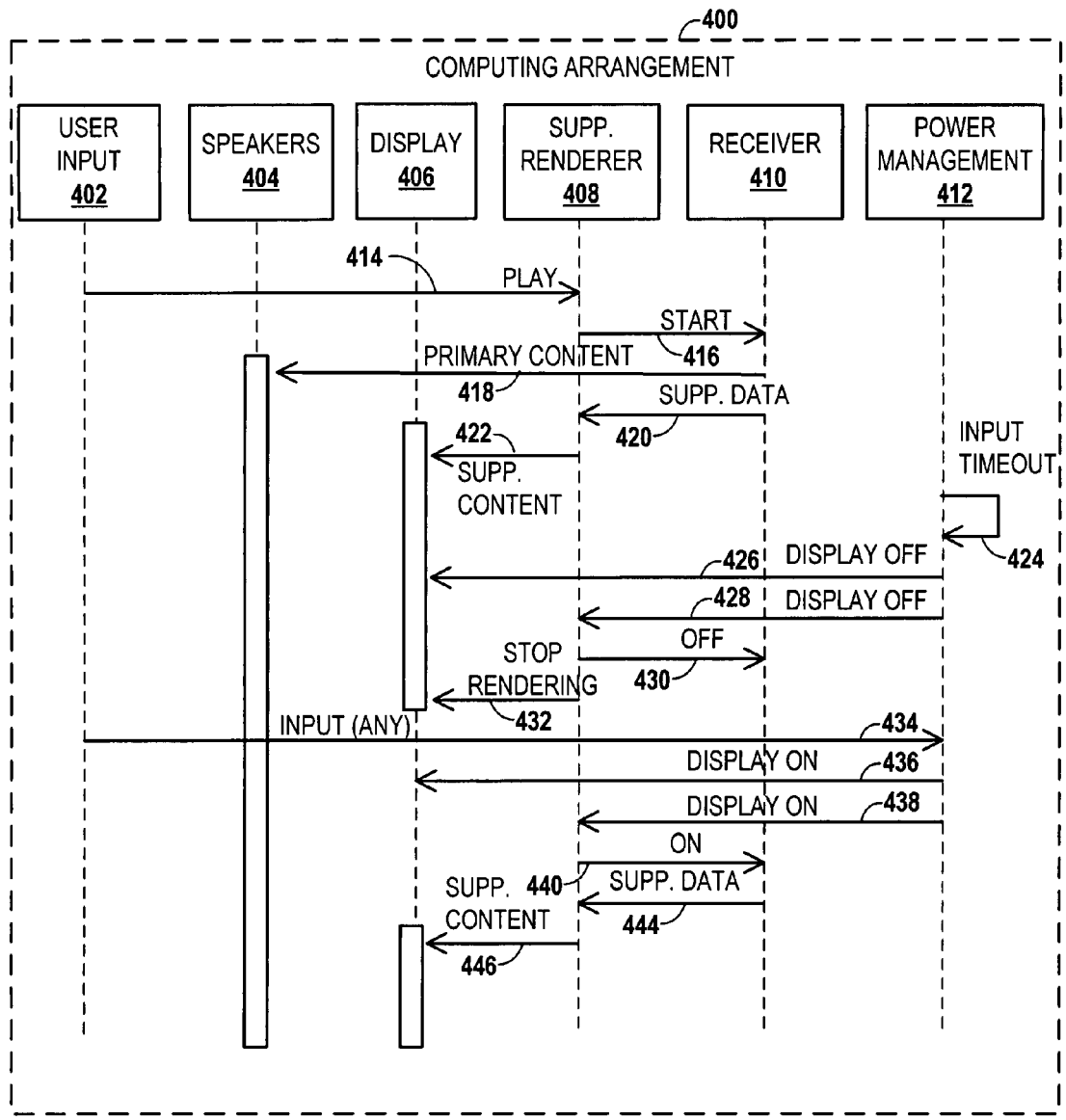
FIG. 4 is a sequence diagram showing interactions between components according to an embodiment of the invention.

In reference now to FIG. 4, a sequence diagram illustrates communications between components in a computing arrangement 400 according to an embodiment of the invention. The arrangement includes user input hardware 402, speakers 404, display 406, supplementary data rendering software 408, receiver hardware 410 and power management module 412. These components 402, 404, 406, 408, 410, 412 may be included in one or more separate physical devices that are coupled through known wired or wireless communications mediums and protocols. It may be assumed at the start of this scenario that the user has already activated the arrangement 400 and that the input hardware 402 and display 406 are activated.

The user, by way of input hardware 402, starts 414 the supplementary rendering software 408 that may be in the form, for example, of an FM radio controller that is capable of handling RDS or other supplementary data broadcasted with the FM radio channels and commonly processed by the receiver 410. In response to the user activation 414, the renderer 408 starts 416 the receiver 410, which may involve powering on and initializing the receiver 410, e.g., tuning to the last accessed station. The primary content 418 is sent to the speakers 404 via digital and/or analog audio circuitry (A/D converters, D/A converters, amplifiers, filters, etc.). Supplemental data 420 is received by the renderer 408, which processes the data 420 and makes it visible as content 422 (e.g., text, images) on the display 406.

The power management module 412 monitors system states (e.g., inputs received via input hardware 402) to determine power saving opportunities (e.g., reduce power used by display 406). If such an opportunity occurs, such as by timeout 424, then a signal 426 is sent to power down the display 406. The renderer also receives/determines a display power down event 428, either from the power management module 412 or elsewhere, and in response signals 430 to the receiver 410 (and/or other intermediate circuitry) to turn off. The renderer 408 also halts 432 its own rendering activity, which may involve writing to display drivers that still operate even if the display hardware is turned off.

Later, in response to any user input 434, the power management module 412 signals 436, 438 that the display 406 should be turned back on, and the renderer 408 signals 440 to the receiver 410 (or other intermediate circuitry) to turn back on. Afterwards, the supplementary data 444 is received and rendered 446 to the display 406 as before.

Figure 5:
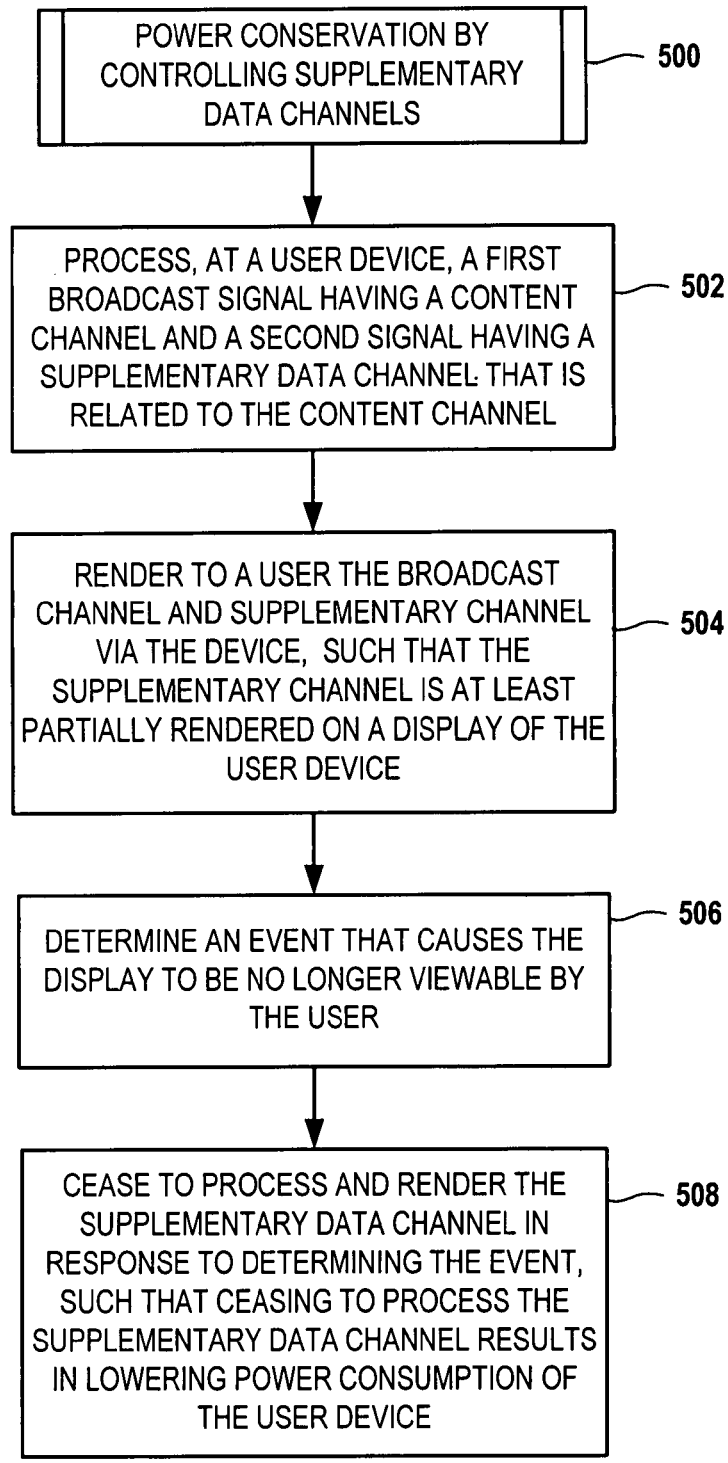
FIGS. 5 and 6 are flowcharts showing procedures according to embodiments of the invention.

In reference now to FIG. 5, a flowchart illustrates a procedure 500 for managing power in a device according to embodiments of the invention. A first broadcast signal having a content channel and a second signal are processed 502 at a user device. The second signal has a supplementary data channel that is related to the content channel. In some embodiments the first broadcast signal and second signal may be processed by the same receiver, such as an FM audio signal and RDS data channel. The broadcast channel and supplementary channel are rendered 504 to a user via the device. The supplementary channel is at least partially rendered on a display of the user device. In the example of FM radio supplemented with RDS, the audio is rendered over a speaker and the RDS data is rendered on a display. An event is determined 506 that causes the display to be no longer viewable by the user. One example of such an event is a backlight of the display turning off. In response to determining the event, processing and rendering the supplementary data channels is ceased 508. Ceasing 508 to process the supplementary data channel results in lowering power consumption of the user device.

Figure 6:
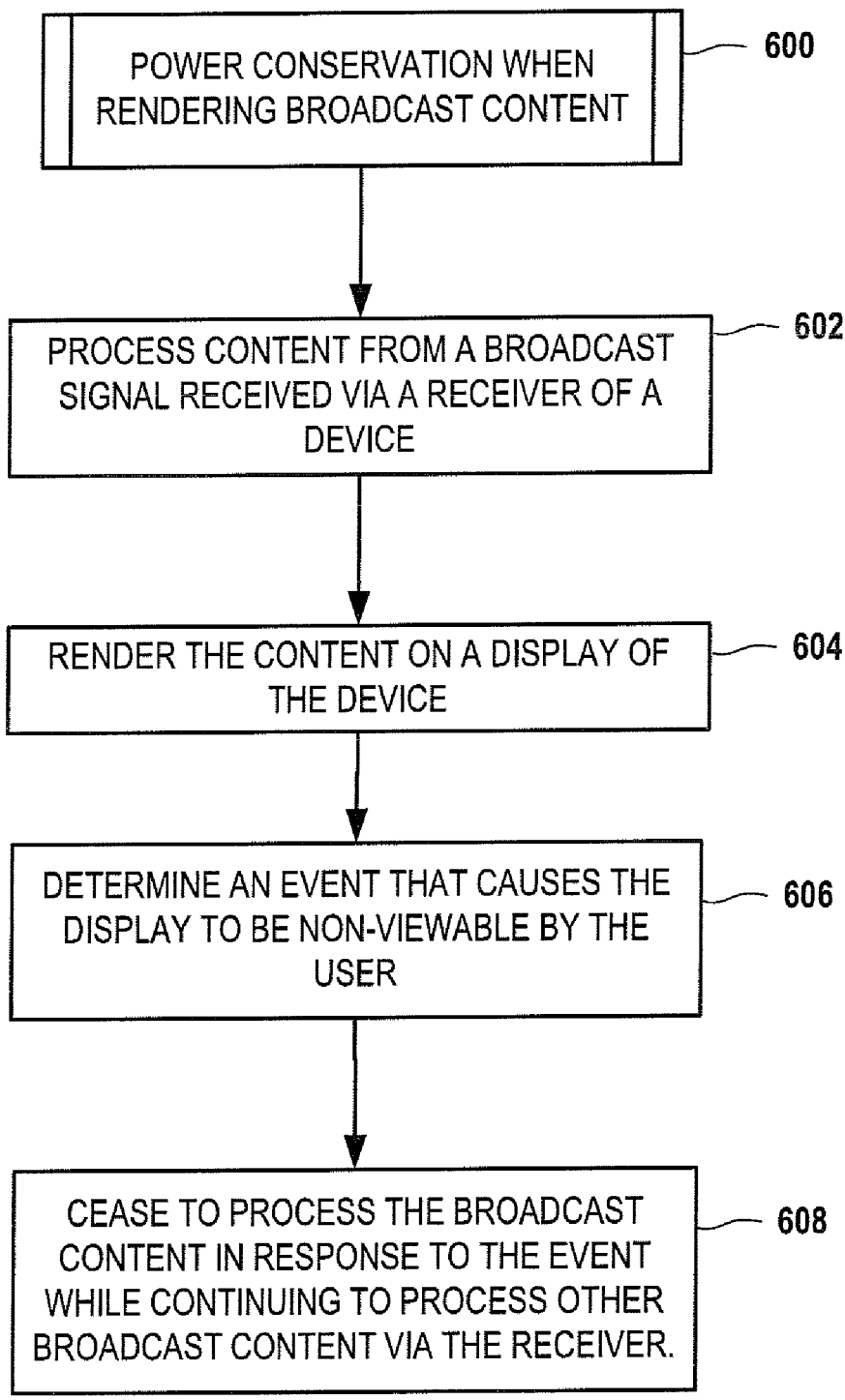

In reference now to FIG. 6, a flowchart illustrates a procedure 600 for managing power when rendering broadcast content. Content from a broadcast signal received via a receiver of a device is processed 602, and the content is rendered 604 on a display of the device. An event is determined 606 that causes the display to non-viewable by the user. Processing of the content ceases 608 in response to the event while the device continues to process other broadcast content via the receiver.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. An apparatus comprising:
   a display driver used to access a display;
   a receiver interface used to access a receiver;
   memory; and
   a processor coupled to the memory, the receiver interface, and the display driver, wherein the memory stores instructions operable by the processor to cause the apparatus to:
   process content from a broadcast signal received via the receiver;
   render the content on the display;
   determine a power saving event that causes the rendered content on the display to be non-viewable by a user, wherein the power saving event comprises a deactivation of a backlight of the display; and
   cease to process the rendered broadcast content in response to the power saving event while continuing to process other broadcast content via the receiver.

2. The apparatus of claim 1, wherein the other broadcast content comprises an audio signal derived from a radio broadcast, and wherein the content comprises supplemental digital data that is associated with and sent in conjunction with the radio broadcast.

3. The apparatus of claim 1, further comprising an application specific integrated circuit coupled to the processor for processing the content from the broadcast signal, and wherein ceasing to process broadcast content comprises removing power from the application specific integrated circuit.

4. The apparatus of claim 1, further comprising interface circuitry coupling the receiver to the processor, and wherein ceasing to process broadcast content comprises removing power from interface circuitry.

5. A method comprising:
   processing, at a user device, a first broadcast signal having a content channel and a second signal having a supplementary data channel that is related to the content channel;
   rendering, to a user, the content channel and supplementary data channel via the user device, wherein the supplementary data channel is at least partially rendered on a display of the user device;
   determining a power saving event that causes the supplementary data channel rendered on the display to be no longer viewable by the user; and
   continuing to render the content channel to the user while ceasing to process and render the supplementary data channel in response to determining the power saving event, wherein ceasing to process the supplementary data channel results in lowering power consumption of the user device.

6. The method of claim 5, wherein the power saving event comprises a deactivation of a display of the user device.

7. The method of claim 6, wherein the power saving event comprises a deactivation of a backlight of the display.

8. The method according to claim 5, wherein the first broadcast signal and second signal are processed by a common receiver of the user device.

9. The method of claim 8, wherein the first broadcast signal comprises a frequency modulated radio signal.

10. The method of claim 9, wherein the supplementary data channel comprises a radio data system channel, and wherein rendering the supplementary data channel comprises displaying text encoded via the radio data system channel.

11. The method of claim 5, wherein ceasing to process and render the supplementary data channel comprises removing power from circuitry used to at least process the supplementary data channel.

12. An apparatus comprising:
    a display driver used to access a display;
    a receiver interface used to access a receiver;
    memory; and
    a processor coupled to the memory, the receiver interface, and the display driver, wherein the memory stores instructions operable by the processor to cause the apparatus to:
    process, via the receiver, a broadcast signal having a content channel and a supplementary data channel;
    render the content channel and the supplementary data channel to a user of the apparatus, wherein the supplementary data channel is at least partially rendered on the display;
    determine a power saving event that causes the supplementary data channel rendered on the display to be no longer viewable by the user; and
    continue to render the content channel to the user while ceasing to process and render the supplementary data channel in response to determining the power saving event, wherein ceasing to process the supplementary data channel results in lowering power consumption of the apparatus.

13. The apparatus of claim 12, wherein the power saving event that causes the display to be no longer viewable by the user comprises an automatic deactivation of the display.

14. The apparatus of claim 13, wherein the automatic deactivation of the display comprises a deactivation of a backlight of the display.

15. The apparatus of claim 12, wherein the broadcast signal comprises a frequency modulated radio signal.

16. The apparatus of claim 15, wherein the supplementary data channel comprises a Radio Data System channel, and wherein rendering the supplementary data channel comprises displaying text encoded via the radio data system channel.

17. The apparatus of claim 12, further comprising a headset coupled to the processor via an input/output bus interface, and wherein the receiver is included in the headset.

18. The apparatus of claim 17, wherein ceasing to process and render the supplementary data channel comprises removing power from the input/output bus interface.

19. A non-transitory computer-readable storage medium including instructions executable by a processor to cause a user device to perform:
    processing a first broadcast signal having a content channel and a second signal having a supplementary data channel that is related to the content channel;
    rendering, to a user, the content channel and supplementary data channel via the user device, wherein the supplementary data channel is at least partially rendered on a display of the user device;
    determining a power saving event that causes the display to be no longer viewable by the user; and
    continuing to render the content channel to the user while ceasing to process and render the supplementary data channel in response to determining the power saving event, wherein ceasing to process the supplementary data channel results in lowering power consumption of the user device.

20. An apparatus comprising:

means for processing a first broadcast signal having a content channel;

means for processing a second signal having a supplementary data channel that is related to the content channel;

means for rendering, to a user, the content channel and supplementary data channel via the user device, wherein the supplementary data channel is at least partially rendered on a display of a user device;

means for determining a power saving event that causes the supplementary data channel rendered on the display to be no longer viewable by the user; and means for continuing to render the content channel to the user while ceasing to process and render the supplementary data channel in response to determining the power saving event, wherein ceasing to process the supplementary data channel results in lowering power consumption of the user device.

* * * * *